June 21, 1966 C. W. GORDON 3,256,926
SLURRY DRYING DEVICE
Filed Nov. 26, 1963 4 Sheets-Sheet 1

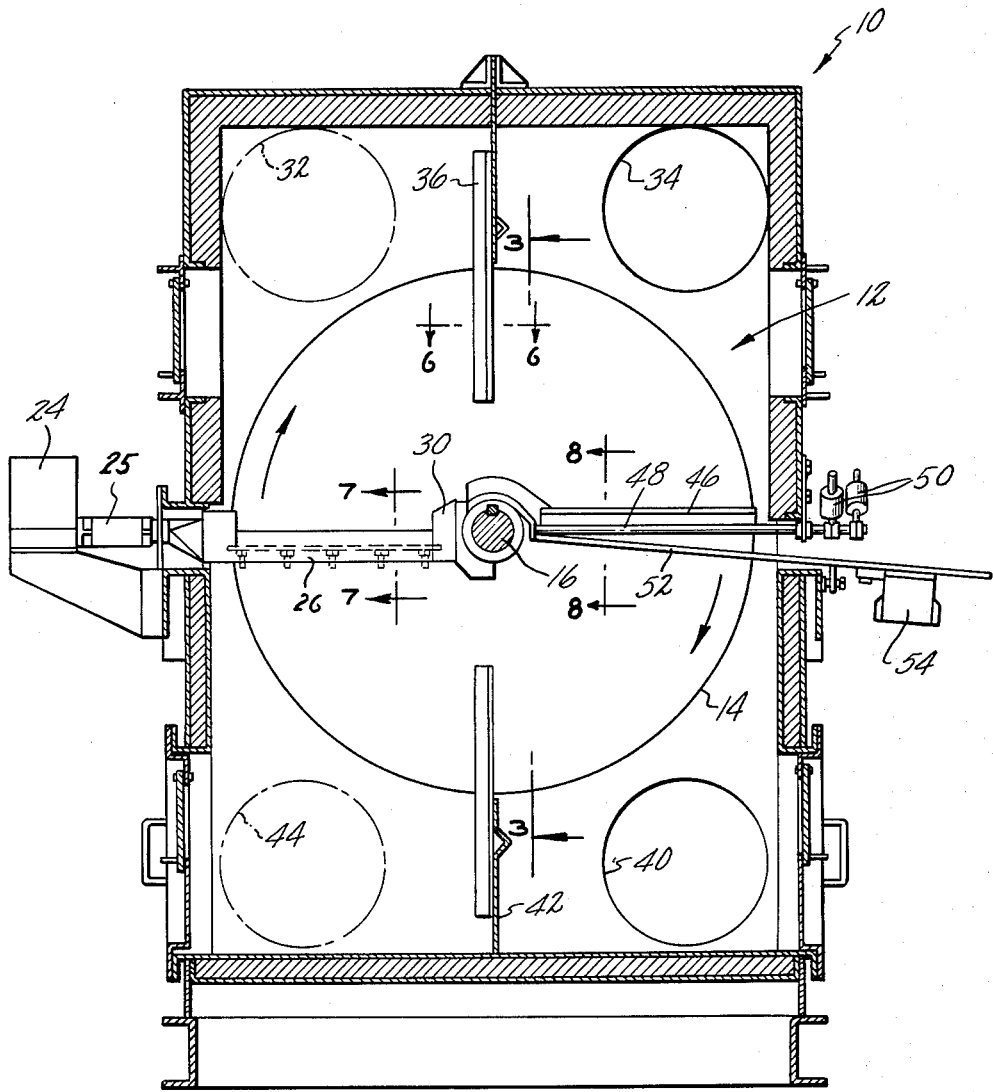
FIG_2

June 21, 1966 C. W. GORDON 3,256,926
SLURRY DRYING DEVICE
Filed Nov. 26, 1963 4 Sheets-Sheet 3

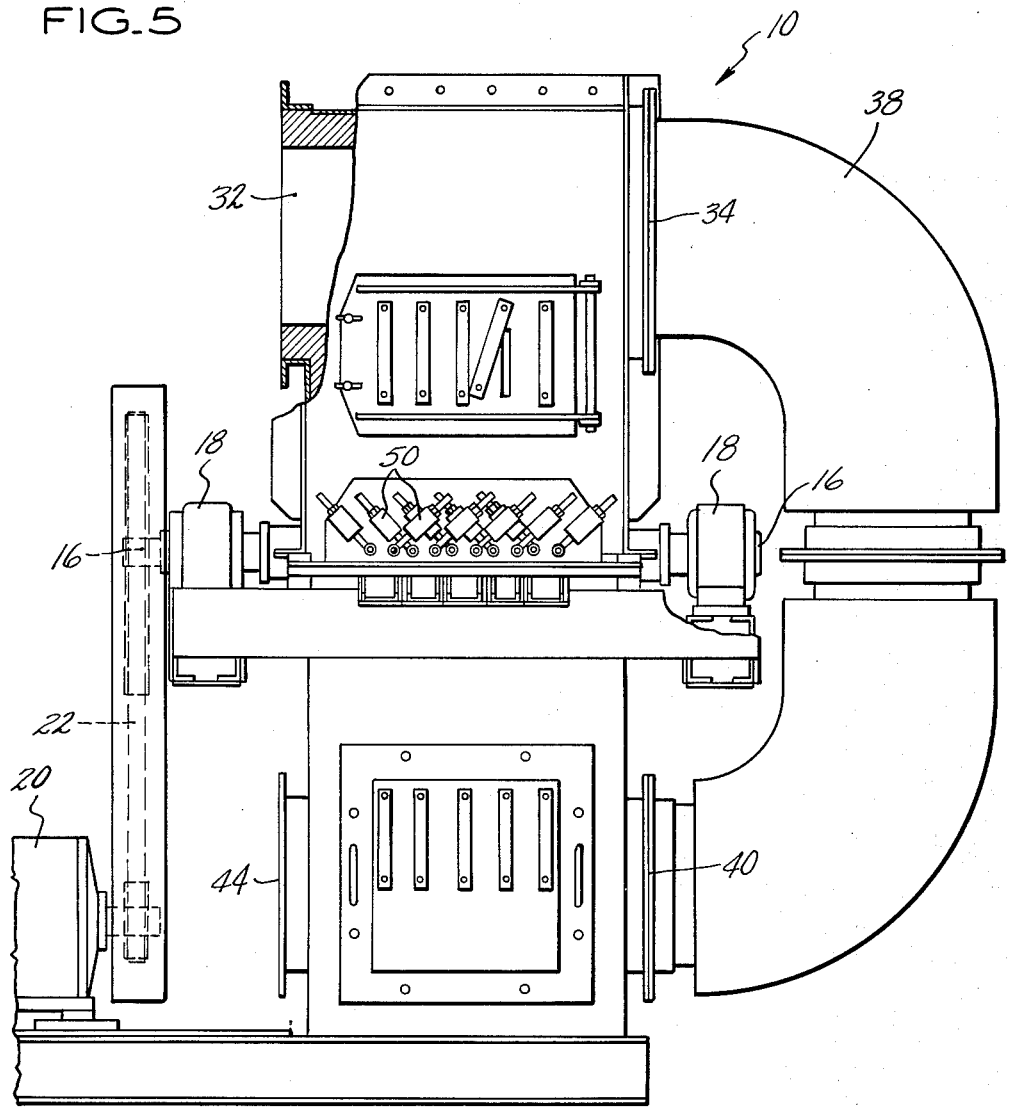

United States Patent Office 3,256,926
Patented June 21, 1966

3,256,926
SLURRY DRYING DEVICE
Charles W. Gordon, Ellyn, Ill., assignor to Combustion Engineering, Inc., Windsor, Conn., a corporation of Delaware
Filed Nov. 26, 1963, Ser. No. 326,015
8 Claims. (Cl. 159—9)

This invention relates generally to dryers and particularly to dryers for slurries that have a rather large percentage of very fine particulate material.

The satisfactory drying of slurries that contain a high percentage of very fine particulate matter, such as 44 microns and smaller is not entirely satisfactorily solved with equipment heretofore available. Ideally, such a drying system must be simple and economical in operation, yet it must be highly reliable. The discharge to atmosphere of the dryer must be substantially entirely free of particulate material and there must be no liquid discharge which will cause contamination of the rivers and streams. While drying systems which entrain the dried material in the drying gas can be employed with slurries having a large percentage of very fine particulate material sufficient difficulty is experienced in operation of these systems so that their use is impracticable. With these systems the dry particulate material must be removed from the drying gas stream by mechanical means. It is well known that the finer the particle size the more difficult it is to mechanically separate the material from the gas stream. In fact, it is impossible to remove more than 95 percent in dry, usable product form. After removing this quantity of material the gases may then be scrubbed with water and about 90 percent of the remaining 5 percent may be removed in very high efficiency scrubbers. Thus, 4.5 percent will be discharged in the scrubber water and the other .5 percent discharged to atmosphere. However, the use of the scrubber is very costly, and it is a large piece of equipment and because of corrosion problems it is fabricated of stainless steel. Furthermore, the disposal of the scrubber discharge is a very troublesome problem in that this cannot be discharged into streams but must be lagooned, where the solids must settle by gravity with this being time consuming and thus limiting the reuse of the water and eventually the lagoons must, of course, be cleaned.

The dryer, in accordance with the present invention, provides a thin coating of the slurry on the surface of a plurality of rotating discs. The discs are heated and a hot gas passes over the coating of slurry so that it is dried to a desirable moisture content after which it is scraped from the discs and conveyed to a desired point of use. The dryer is continuous in its operation and is capable of providing a very large drying capacity, and with the invention there is little or no entrainment of the dried particulate material in the gas stream and no contaminating liquid discharge is produced.

It is an object of this invention to provide an improved slurry drying device which will receive the wet slurry directly and dry it to a saleable product without entraining the dry solids in the hot gas stream at any stage.

A still further object of the invention is to provide an improved slurry dryer which is simple in operation and effects the drying of the slurry without producing either a gas stream or a liquid stream as a discharge from the dryer which contains substantial amounts of the particulate material of the slurry.

A still further object of the invention is to provide an improved slurry dryer which is continuous in its operation with the slurry being coated onto rotating discs with the coating being dried and then scraped from the discs.

Other and further objects of the invention will become apparent to those skilled in the art as the description proceeds.

With the aforementioned objects in view, the invention comprises an arrangement, construction and combination of the elements of the inventive organization in such a manner as to obtain the results desired as hereinafter more particularly set out in the following detailed description of an illustrative embodiment, said embodiment being shown by the accompanying drawings wherein:

FIGURE 2 is a vertical transverse sectional view of the improved drying apparatus of the invention;

FIGURE 5 is in the nature of an elevational end view of the improved dryer apparatus;

Figure 1:
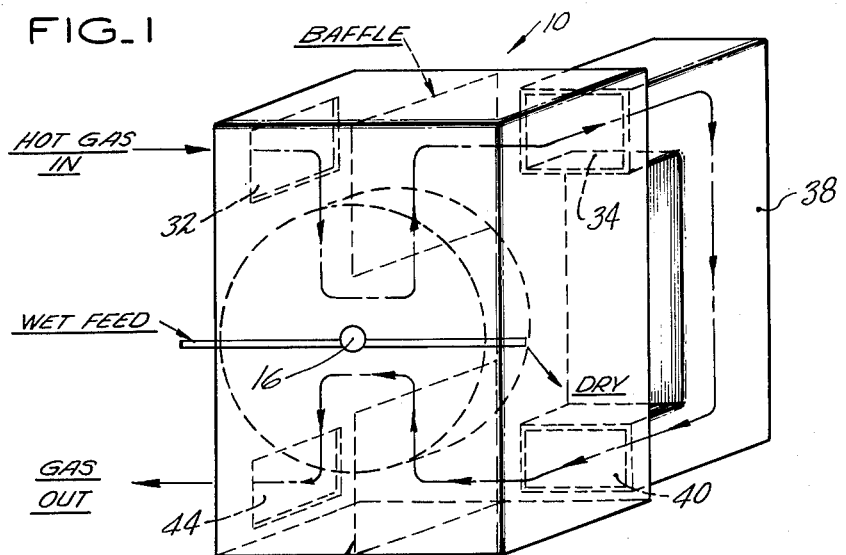
FIGURE 1 is a diagrammatic representation in the nature of a flow chart depicting the operation of the present invention.
Figure 3:
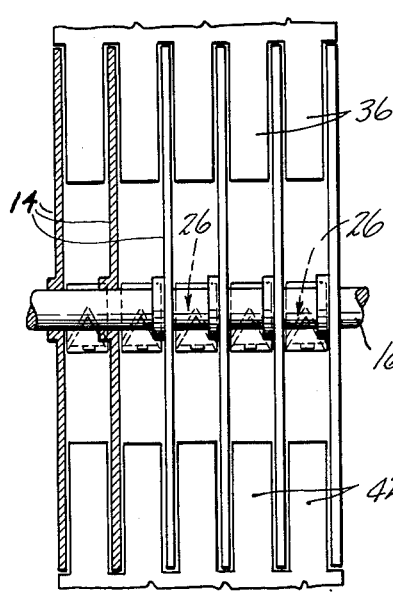
FIGURE 3 is a fragmentary sectional view of a portion of the rotating disc assembly taken generally along line 3—3 of FIGURE 2.
Figure 7:
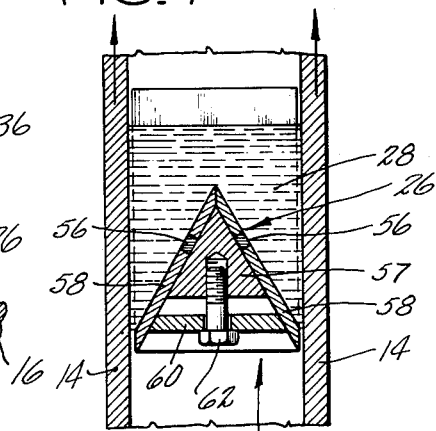
Figure 8:
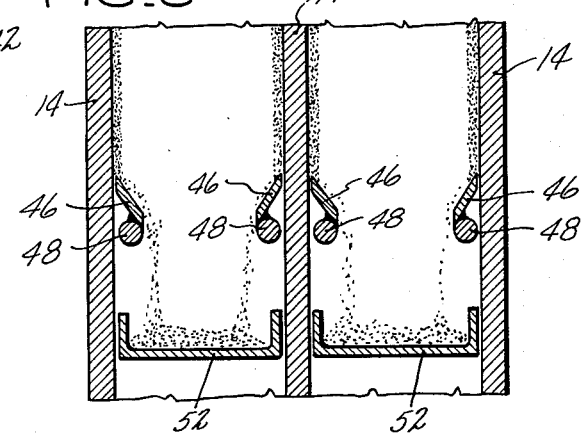
Figure 4:
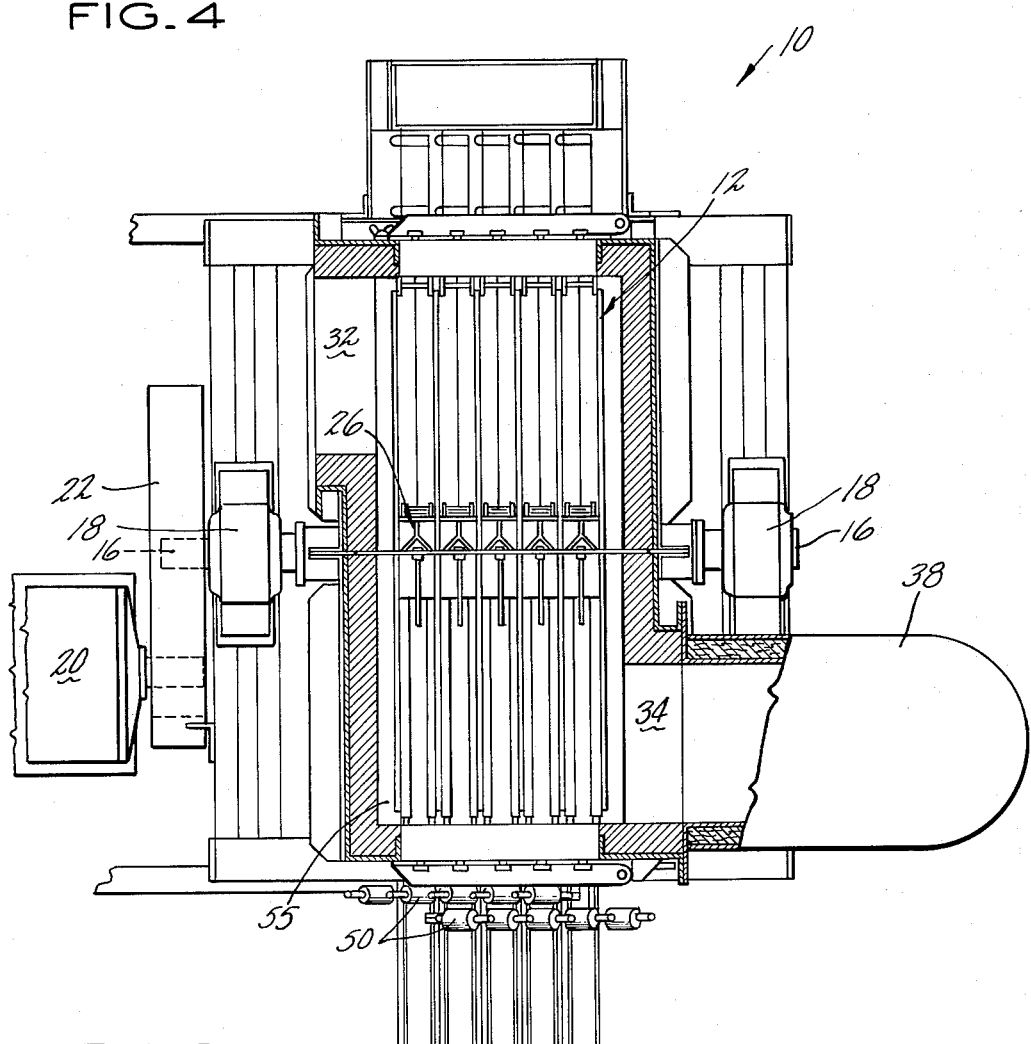
FIGURE 4 is in the nature of a horizontal sectional view of the improved dryer of the invention with this figure showing the interior construction as viewed from above.

FIGURE 7 is a fragmentary sectional view showing the construction and placement of the portion of the distribution manifold for the wet feed device that is positioned intermediate adjacent rotating discs and acts as a bottom or floor for the pool of slurry that is maintained between these discs, this sectional view is taken generally along line 7—7 of FIGURE 2; and FIGURE 8 is a fragmentary sectional view taken generally along line 8—8 of FIGURE 2 and showing the scraper organization for scraping the dried material from the surface of the plates.

Illustrative of the material for which the dryer or the present invention is adapted for use is the so-called thickener underflow that is produced in coal preparation plants. In these plants, a wet process is generally used to clean the coal. With this process there is a build-up of ultrafine solids in the wash water. These solids are removed in a thickener so that the water may be reused and the slurry that is removed from the bottom of the thickener is termed the "thickener under-flow." This slurry contains about 50 percent moisture and the particle size of the solids is 100 percent through 100 mesh and 85 percent through 325 mesh.

Referring now to the drawing, wherein like reference characters are used throughout to designate like elements, the illustrative and preferred embodiment of the improved dryer of the invention disclosed therein includes the housing 10 within which is mounted the rotatable plate assembly 12. This assembly includes a number of circular plates or discs 14 that are mounted in coaxial relation on the support shaft 16. This shaft is horizontally disposed and is received at its opposite ends within the journals 18. The plates 14 are positioned in uniform spaced relation along the shaft 16 and rotation of the assembly is achieved by means of the motor 20 and drive 22 with this drive including a high gear reduction and being adjustable so that the speed of rotation of the assembly may be varied as for example between 1 and 5 r.p.m. Suitable seals are provided where the shaft 16 extends through the walls of the housing 10 so as to substantially prevent leakage of air from the housing about the shaft.

As the assembly 12 rotates about the axis of the shaft 16, a coating of slurry is applied to the opposed faces of each adjacent pair of discs or plates as these faces move upwardly past a wet feeding or feed location. Generally diametrically opposite this wet feed location there is provided scraper means for scraping the dried slurry from the faces of these plates with the slurry having been dried in its passage or traverse from the wet feed location to this location of removal of the slurry from the plate surfaces.

In the illustrative embodiment the wet feed system includes a storage tank or compartment 24 within which a supply of slurry is maintained at a predetermined and constant level such as by means of a weir overflow or by means of a float operated inlet control. Extending from this compartment 24 is a distribution manifold 25 which conveys the slurry to a location intermediate adjacent pairs of discs or plates 14. Forming an extension of manifold 25 and extending inwardly, intermediate each adjacent set of plates at this location is the inverted V-shaped member 26 which forms the bottom support for a pool of slurry 28 that is between and in contact with the adjacent pair of plates or discs. The inwardly extending end of the member 26 is connected with member 30 which acts as a dam for the pool 28 and which has a portion that extends over the shaft 16 so as to provide a support for this end member 26.

The height of the slurry pool 28 intermediate adjacent pairs of plates or discs 14 is maintained at a predetermined and constant value, such as shown in FIGURE 7, and as a result of this pool being maintained intermediate these pairs of plates, a coating of slurry (such as ⅛ inch with the "thickener underflow" hereinbefore mentioned) is provided on the surface of the plates as they move upwardly past this wet feed location.

The drying action which is obtained with the present invention is achieved through the absorption of heat from the preheated discs plus convection heat transfer from the gas stream that passes over the plates that are coated with this layer of slurry. Drying gas such as air at 1000° F., is admitted to the inlet opening 32, passes over the upper region of the rotating assembly 12 and leaves the upper portion of the housing 10 through the discharge opening 34. In order to improve the efficiency of contact of the hot gas with the upper region of the rotating assembly the finger baffle 36 is provided which extends down from the upper region of the housing 10 and intermediate the spaced discs 14 so as to direct the drying gas inwardly of the rotating assembly 12. The drying gases are conveyed from the outlet 34 through the duct 38 to the inlet opening 40 at the lower region of housing 10. These gases, which are still relatively hot, then pass over the lower portion of the rotating assembly, from which the dried material has been previously removed and thereby heat the plates prior to their being coated with slurry at the wet feed location. Another finger baffle 42, similar to baffle 36, is provided for efficient contact of the gas with the lower region of the rotating assembly and the gas is then discharged through the discharge opening 44 at a temperature such as 300° F.

As a result of the discs 14 being hot when the coating of slurry is applied to them and being maintained hot by the gases passing over the upper region of the rotating assembly and as a result of these gases coming in contact with and passing over the layer of slurry that is applied to the discs, this layer of slurry is dried as the discs slowly rotate about the axis of shaft 16. At a location generally diametrically opposite the location of the wet feed, the layer of now dried material is scraped from the surfaces of the discs and is removed to a desired point being conveyed from intermediate adjacent pairs of discs and preferably from the housing 10. This removal of the dried layer of material is accomplished by means of providing scrapers 46 that are mounted on rotatable shafts 48 with these shafts being extended beyond the discs and having mounted on their outer ends counterweights 50 which urge the beveled edge of the scrapers 46 into engagement with the adjacent plate surface. By means of these scrapers the dried layer of material is removed from the surface of the discs. This dried layer of material falls down upon the trough 52 which is inclined downwardly as illustrated in FIGURE 2 and to which is attached vibrator 54 whereby the material continuously passes down the chute or trough 52 so that it may be collected in a desired depository.

The system for coating slurry onto the surfaces of the plate at the wet feed location and the system for removing dry material from the surface of the plates is such as to prevent any substantial by-pass of the heated drying gas from the upper region of the housing to the lower region of this housing without this gas passing through the duct 38. In this connection, at the location of the wet feed and at the location of removal of the dry material, there is provided baffle 55 that extends inwardly from the wall of the housing to a location adjacent the outer surface of the outermost discs at the two extremities of the rotating assembly.

Figure 6:
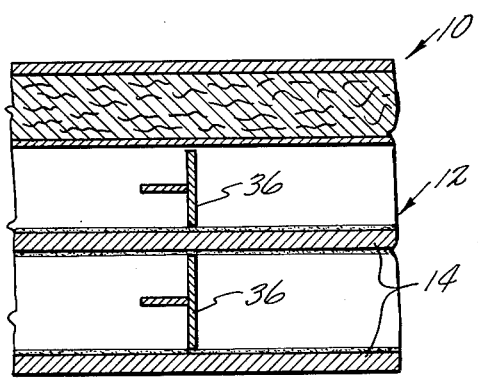
FIGURE 6 is a fragmentary sectional view showing the construction and placement of the baffles intermediate the rotating discs and intermediate the end disc and the wall of the casing with this view being taken generally along line 6—6 of FIGURE 2.

The construction of the finger baffles 36 is preferably that disclosed in FIGURE 6 with the fingers being generally of T transverse cross-section and with these fingers extending downwardly from a plate that terminates close to the periphery of the disc 14.

The member 26 is adjustable to a limited extent so that minor variation in spacing of the adjacent plates or discs 14 may be accommodated. For this purpose, the inverted V-shaped member 26 is provided with a central support 57 which may be continuous or intermittent and which is triangular in transverse section as disclosed in FIGURE 7. Welded to this support 57 at the location 56 are the plates 58 and intermediate these plates is positioned the bar 60. This bar is provided with an aperture through which extends the cap screw 62 that is threadedly received in the support 57. By means of adjusting the cap screw the lower ends of the plates 58 may be adjusted relative to each other, within limits.

The inverted V design for the member 26 to support the slurry pool 28 provides for continuous agitation of the slurry and thus prevents "settling out" of the particular material in the slurry. This continuous agitation is effected by the upwardly moving surface of the adjacent pair of discs 14 on each side of the slurry pool 28.

Due to the ultra-fine particle size of the dry material, it is desired to retain as much of the agglomeration of this material as possible. It is for this as well as other reasons, that the vibrating type of discharge chute is utilized.

It will thus be appreciated that with the present invention there is provided an improved and simple dryer for slurries that contain a large percentage of very fine solids. With the invention, the dried material is easily removed in broken flake form at any desired moisture content where the final moisture being controlled by varying the inlet gas temperature and also by varying the speed of rotation of the rotating assembly.

While I have illustrated and described a preferred embodiment of my invention it is to be understood that such is merely illustrative and not restrictive and that variations and modifications may be made therein without departing from the spirit and scope of the invention. I therefore do not wish to be limited to precise details set forth but desire to avail myself of such changes as fall within the purview of my invention.

What I claim is:

1. A slurry dryer comprising in combination a housing, a rotating plate assembly comprising a plurality of parallel circular flat plates mounted on a generally horizontal shaft in spaced relation with each other and perpendicular to the shaft, means for rotating said assembly about the axis of said shaft, means for directing a stream of hot gas over said assembly including the upper and lower region thereof on both sides of the axis, a system for feeding slurry to said assembly along substantially the entire lengths of the plate radii at generally the axial horizontal location on the upperly moving sides of the assembly relative to the direction of rotation and including means for maintaining a pool of the slurry intermediate and in contact with the spaced plates at this location and extending from the periphery to the generally inner-most region of the plate whereby the surfaces of the plates as they move upwardly past this location received a thin coating of the slurry, and generally radially extending means angularly spaced from this feeding system, in the direction of rotation of the assembly operative to scrape this dried coating from these plates and remove the same from intermediate said plates.

2. The drying organization of claim 1 wherein the means for scraping the coating from the surface of the plates includes scraper blades mounted generally diametrically opposite the location of the feeding system with the blades being urged into engagement with the plates, means disposed below the scraper blades intermediately said spaced plates to receive the material as it is scraped from the surface of the plates and to convey the removed material from intermediate feed plates to a desired point.

3. The drying system of claim 2 wherein the last-named means for removing material from intermediate the spaced plates comprises a trough inclined downwardly from the inner axial region of said assembly and means for vibrating said trough so that the material passes down said incline.

4. The dryer organization of claim 1 wherein the means for maintaining a pool includes means extending horizontally intermediate adjacent plates to form the bottom support for the pool disclosed intermediate to these plates, this means having an inverted V transverse configuration and means for supplying slurry to the region above this means to maintain a pool of slurry at a desired level intermediate the plates.

5. A drying device for a slurry containing fine particulate material comprising in combination a plurality of parallel plates co-axially mounted on a horizontal support shaft in axially spaced relation and perpendicular to the shaft, means for rotating said plates about the axis of said shaft in a predetermined direction, means for applying a coating to the surface of said plates including a generally horizontal dam member disposed intermediate each adjacent pair of plates on the upwardly moving side of the plates and into close proximity with the plate surfaces to form the bottom support for a pool of slurry, said dam member including plate members inclined upwardly from adjacent the spaced pair of plates to a location intermediate therebetween, means for adjusting the spacing between the lower extremities of these inclined plates, means for supplying slurry to the region intermediate the plates and above the dam member and to maintain the level of slurry therein at a generally desired value, means at a location spaced from the location where the wet feed is applied to the plate surfaces for scraping and removing the dried material from the plates, and means directing a hot gas stream over said plates.

6. A drying device for a slurry containing fine particulate material comprising in combination a plurality of parallel plates co-axially mounted on a horizontal support shaft in axially spaced relation and perpendicular to the shaft, means for rotating said plates about the axis of said shaft in a predetermined direction, means for applying a coating to the surface of said plates including a generally horizontal dam member disposed intermediate each adjacent pair of plates on the upwardly moving side of the plates and into close proximity with the plate surfaces to form the bottom support for a pool of slurry, the inner end of said dam member including means disposed over and supported on said shaft, said dam member including plate members inclined upwardly from adjacent the spaced pair of plates to a location intermediate therebetween, a member extending intermediate the lower extremities of said inclined plates and means for adjustably positioning said member in a generally vertical direction to adjust the spacing of the plates lower extremities, means for supplying slurry to the region intermediate the plates and above the dam member and to maintain the level of slurry therein at a generally desired value, means at a location spaced from the location where the wet feed is applied to the plate surfaces for scraping and removing the dried material from the plates, and means directing a hot gas stream over said plates.

7. A drying device for a slurry containing fine particulate material comprising in combination a plurality of parallel plates co-axially mounted on a horizontal support shaft in axially spaced relation and perpendicular to the shaft, means for rotating said plates about the axis of said shaft in a predetermined direction, means for applying a coating to the surface of said plates including a generally horizontal dam member disposed intermediate each adjacent pair of plates on the upwardly moving side of the plates and into close proximity with the plate surfaces to form the bottom support for a pool of slurry, said dam member including plate members inclined upwardly from adjacent the spaced pair of plates to a location intermediate therebetween, means for adjusting the spacing between the lower extremities of these inclined plates, means for supplying slurry to the region intermediate the plates and above the dam member and to maintain the level of slurry therein at a generally desired value, means for scraping a layer of dried material from the surface of the plates at a location spaced from the location where the wet feed is applied to the plates, this last-named means including scraper blades that are biased into engagement with the surface of the plates and with these blades being generally horizontally disposed, vibrating troughs inclined downwardly from the inner region of the plates toward the outer region and disposed beneath these scraper blades to receive the dried material as it is scraped from the plate surfaces and conveyed to its desired location, and means directing a hot gas stream over said plates.

8. A slurry dryer comprising in combination a housing, a rotating plate assembly comprising a plurality of parallel circular flat plates mounted on a generally horizontal shaft in spaced relation with each other and perpendicular to the shaft, means for rotating said assembly about the axis of said shaft, means for directing a stream of hot gas over said assembly including the upper and lower region thereof on both sides of said axis, a system for feeding slurry to said assembly at a horizontal location on the upperly moving side of the assembly relative to the direction of rotation and including means for maintaining a pool of the slurry intermediate and in contact with the spaced plates at this location whereby the surfaces of the plates as they move upwardly past this location received a thin coating of the slurry, means spaced from this feeding system in the direction of location of the assembly operative to scrape this coating from these plates and remove the same from intermediate said plates, and baffle means provided in the housing and extending a limited distance intermediate the plates towards the center of the assembly at both upper and lower regions of the assembly intermediate the location of supplying slurry to the plates and the location where the slurry is scraped from the plates whereby the gases are directed inwardly and then outwardly of the upper and lower regions of the assembly in their traverse of the same.

References Cited by the Examiner

UNITED STATES PATENTS

| | | | |
|---|---|---|---|
| 1,176,078 | 3/1916 | Mick et al. | 159—10 |
| 1,501,515 | 7/1924 | Testrup | 159—12 |
| 2,235,324 | 3/1941 | Moreland | 18—55 |
| 2,240,376 | 4/1941 | Nyquist | 159—10 |
| 2,698,287 | 12/1954 | Bowden et al. | 202—158 |

FOREIGN PATENTS

| | | |
|---|---|---|
| 532,001 | 8/1931 | Germany. |
| 348,062 | 4/1931 | Great Britain. |
| 351,328 | 6/1931 | Great Britain. |
| 75,031 | 8/1927 | Sweden. |

NORMAN YUDKOFF, *Primary Examiner.*

ROBERT F. BURNETT, *Examiner.*

J. SOFER, *Assistant Examiner.*